United States Patent
Zhang et al.

(10) Patent No.: US 8,081,595 B2
(45) Date of Patent: *Dec. 20, 2011

(54) METHOD AND APPARATUS FOR SCHEDULING TRANSMISSIONS VIA AN ENHANCED DEDICATED CHANNEL

(75) Inventors: Guodong Zhang, Farmingdale, NY (US); Jung-Lin Pan, Smithtown, NY (US); Peter S. Wang, E. Setauket, NY (US); Robert A. DiFazio, Greenlawn, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 728 days.

This patent is subject to a terminal disclaimer.

(21) Appl. No.: 12/173,363

(22) Filed: Jul. 15, 2008

(65) Prior Publication Data

US 2008/0273483 A1    Nov. 6, 2008

Related U.S. Application Data

(63) Continuation of application No. 11/402,718, filed on Apr. 12, 2006, now Pat. No. 7,408,895.

(60) Provisional application No. 60/673,076, filed on Apr. 20, 2005.

(51) Int. Cl.
*H04B 7/185* (2006.01)
*H04Q 7/24* (2006.01)

(52) U.S. Cl. ........................................ 370/318; 370/338

(58) Field of Classification Search .......... 370/230–235, 370/311, 318, 328, 338
See application file for complete search history.

(56) References Cited

U.S. PATENT DOCUMENTS

| | | | |
|---|---|---|---|
| 6,654,358 B1 | 11/2003 | Park et al. | |
| 6,845,088 B2 | 1/2005 | Terry et al. | |
| 7,010,317 B2* | 3/2006 | Hwang et al. | 455/522 |
| 7,161,971 B2 | 1/2007 | Tiedemann, Jr. et al. | |
| 7,382,747 B2 | 6/2008 | Hu et al. | |
| 7,397,790 B2 | 7/2008 | Zeira et al. | |
| 7,408,895 B2 | 8/2008 | Zhang et al. | |
| 7,509,554 B2 | 3/2009 | Lohr et al. | |
| 2003/0232622 A1* | 12/2003 | Seo et al. | 455/437 |
| 2004/0100921 A1* | 5/2004 | Khan | 370/321 |
| 2004/0185892 A1 | 9/2004 | Iacono et al. | |
| 2004/0219917 A1* | 11/2004 | Love et al. | 455/436 |

(Continued)

OTHER PUBLICATIONS

Third Generation Partnership Project, "Technical Specification Group Radio Access Network; Feasibility Study for Enhanced Uplink for UTRA FDD (Release 6)," 3GPP TR 25.896 V6.0.0 (Mar. 2004).

*Primary Examiner* — Hog Cho
(74) *Attorney, Agent, or Firm* — Volpe and Koenig, P.C.

(57) ABSTRACT

A method and apparatus for scheduling transmissions via an enhanced dedicated channel (E-DCH) are disclosed. A scheduled power is calculated for scheduled data flows. A remaining transmit power is calculated for the E-DCH transmission. A rate request message is generated, wherein the scheduled power, remaining transmit power and rate request message are used to select transport format combinations (TFCs) and multiplex data scheduled for the E-DCH transmission. The remaining transmit power is calculated by subtracting from a maximum allowed power the power of a dedicated physical data channel (DPDCH), a dedicated physical control channel (DPCCH), a high speed dedicated physical control channel (HS-DPCCH), an enhanced uplink dedicated physical control channel (E-DPCCH) and a power margin.

21 Claims, 5 Drawing Sheets

U.S. PATENT DOCUMENTS

| | | |
|---|---|---|
| 2004/0219919 A1* | 11/2004 | Whinnett et al. .............. 455/442 |
| 2004/0219920 A1* | 11/2004 | Love et al. .................... 455/442 |
| 2005/0025100 A1* | 2/2005 | Lee et al. ....................... 370/335 |
| 2005/0030953 A1* | 2/2005 | Vasudevan et al. ......... 370/395.4 |
| 2005/0043062 A1* | 2/2005 | Ahn et al. ..................... 455/560 |
| 2005/0047416 A1 | 3/2005 | Heo et al. |
| 2005/0073985 A1* | 4/2005 | Heo et al. ..................... 370/342 |
| 2005/0076173 A1* | 4/2005 | Merril et al. .................. 711/100 |
| 2005/0079865 A1* | 4/2005 | Ahn et al. ..................... 455/434 |
| 2005/0117559 A1* | 6/2005 | Malladi et al. ................ 370/342 |
| 2005/0124372 A1 | 6/2005 | Lundby et al. |
| 2005/0249138 A1 | 11/2005 | Heo et al. |
| 2005/0249148 A1* | 11/2005 | Nakamata et al. ............ 370/328 |
| 2005/0265301 A1* | 12/2005 | Heo et al. ...................... 370/349 |
| 2006/0003787 A1* | 1/2006 | Heo et al. ...................... 455/522 |
| 2006/0111119 A1 | 5/2006 | Iochi |
| 2006/0120404 A1 | 6/2006 | Sebire et al. |
| 2006/0143444 A1 | 6/2006 | Malkamaki et al. |
| 2006/0187844 A1 | 8/2006 | Chun et al. |
| 2007/0121542 A1 | 5/2007 | Lohr et al. |
| 2007/0168827 A1 | 7/2007 | Lohr et al. |
| 2009/0034455 A1 | 2/2009 | Lee et al. |

* cited by examiner

| PRI | FIRST MAC-d-FLOW IN THE COMBINATION | | | SECOND MAC-d-FLOW IN THE COMBINATION | | | SO ON (ACCORDING TO MAC-d-FLOW PRIORITIES IN THE LIST) | | |
|---|---|---|---|---|---|---|---|---|---|
| | FORMATTED DDI | CURRENT TOTAL FLOW SIZE (INCLUDE HEADER SIZE) | PDU-SIZE | FORMATTED DDI | CURRENT TOTAL FLOW SIZE (INCLUDE HEADER SIZE) | PDU-SIZE | FORMATTED DDI | CURRENT TOTAL FLOW SIZE (INCLUDE HEADER SIZE) | PDU-SIZE |
| | NEXT TSN | | NUMBER OF BLOCKS (N) | NEXT TSN | | NUMBER OF BLOCKS (N) | NEXT TSN | | NUMBER OF BLOCKS (N) |

| TOTAL LOAD (PAYLOAD + HEADER) OF THE COMBINATION | | | | | | | | | |
|---|---|---|---|---|---|---|---|---|---|
| PAYLOAD SIZE + HEADER SIZE | | | | | | | | | |
| 1 | | | | | | | | | |
| 2 | | | | | | | | | |
| SO ON | | | | | | | | | |

*FIG. 4*

METHOD AND APPARATUS FOR SCHEDULING TRANSMISSIONS VIA AN ENHANCED DEDICATED CHANNEL

CROSS REFERENCE TO RELATED APPLICATIONS

This application is a continuation of U.S. patent application Ser. No. 11/402,718 filed Apr. 12, 2006 which issued as U.S. Pat. No. 7,408,895 on Aug. 5, 2008, which claims the benefit of U.S. Provisional Application No. 60/673,076 filed Apr. 20, 2005, which is incorporated by reference as if fully set forth.

FIELD OF INVENTION

The present invention relates to wireless communication systems. More particularly, the present invention is related to a method and apparatus for scheduling transmissions via an enhanced dedicated channel (E-DCH).

BACKGROUND

Methods for improving uplink (UL) coverage, throughput, and transmission latency are currently being investigated in the third generation partnership project (3GPP). In order to achieve these goals, enhanced uplink (EU) transmissions have been proposed in 3GPP, in which control, (i.e., scheduling and assigning), of UL resources, (i.e., physical channels), is moved from a radio network controller (RNC) to a Node-B.

Figure 1A:
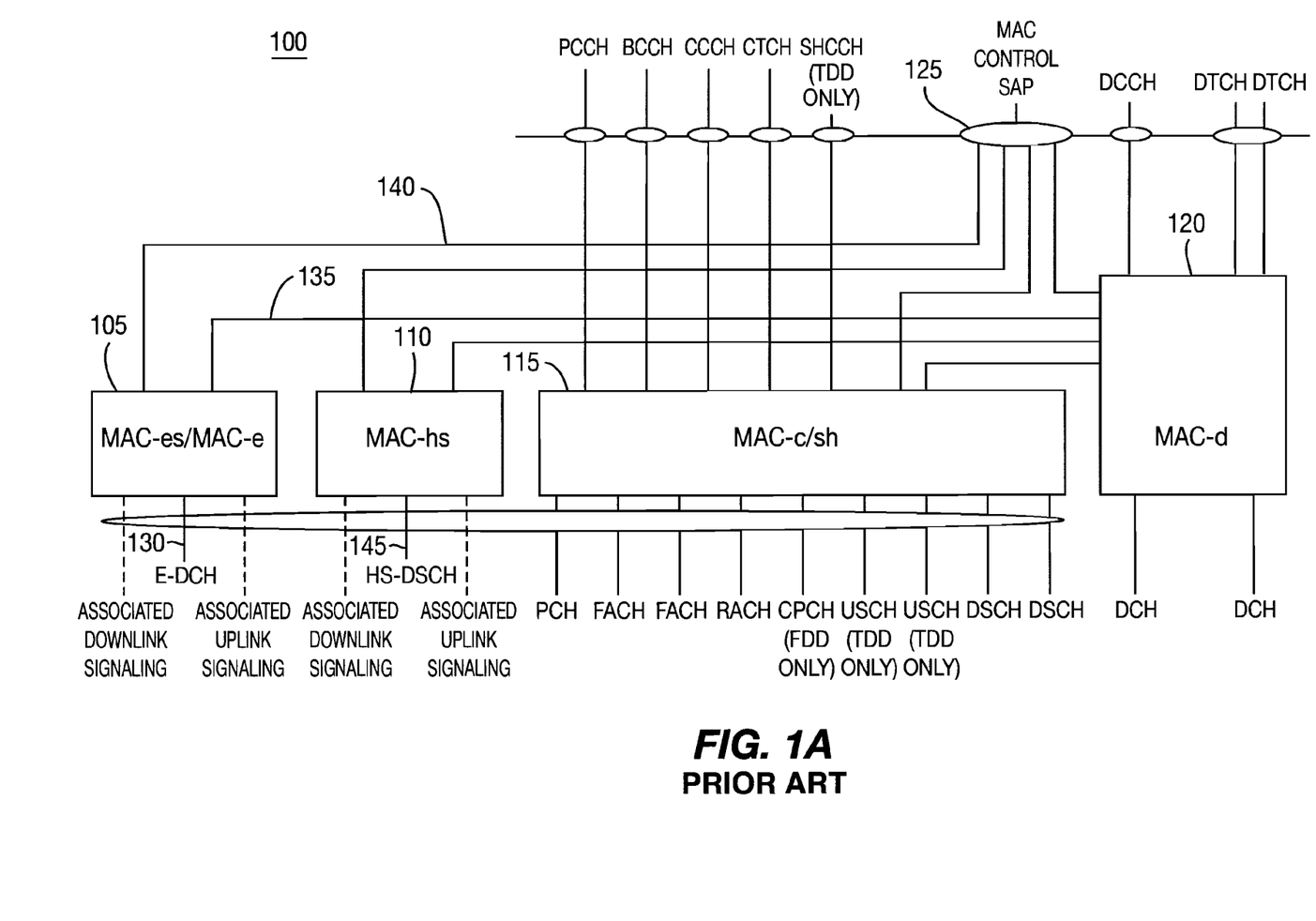
FIG. 1A shows a conventional WTRU side MAC architecture.

FIG. 1A shows a conventional wireless transmit/receive unit (WTRU), (e.g., mobile station), side medium access control (MAC) architecture 100. The WTRU MAC architecture 100 includes a MAC-es/MAC-e entity 105, which comprises different independent sub-layer entities within the MAC. The MAC-es/-e functionality split is a result of how the MAC functionality is partitioned within the universal terrestrial radio access network (UTRAN). The WTRU MAC architecture 100 further includes a high speed MAC entity 110, a MAC-c/sh 115, a dedicated channel MAC (MAC-d) 120 and a MAC control service access point (SAP) 125. The MAC-c/sh 115 controls access to all common transport channels, except the HS-DSCH transport channel 145. The MAC-d 120 controls access to all dedicated transport channels, to the MAC-c/sh 115 and the MAC-hs 110. The MAC-hs 110 controls access to the HS-DSCH transport channel 145.

The MAC-es/MAC-e entity 105 controls access to an E-DCH 130, whereby the MAC-d 120 may access the E-DCH 130 via a connection 135, and the MAC control SAP 125 may access the E-DCH 130 via a connection 140.

Figure 1B:
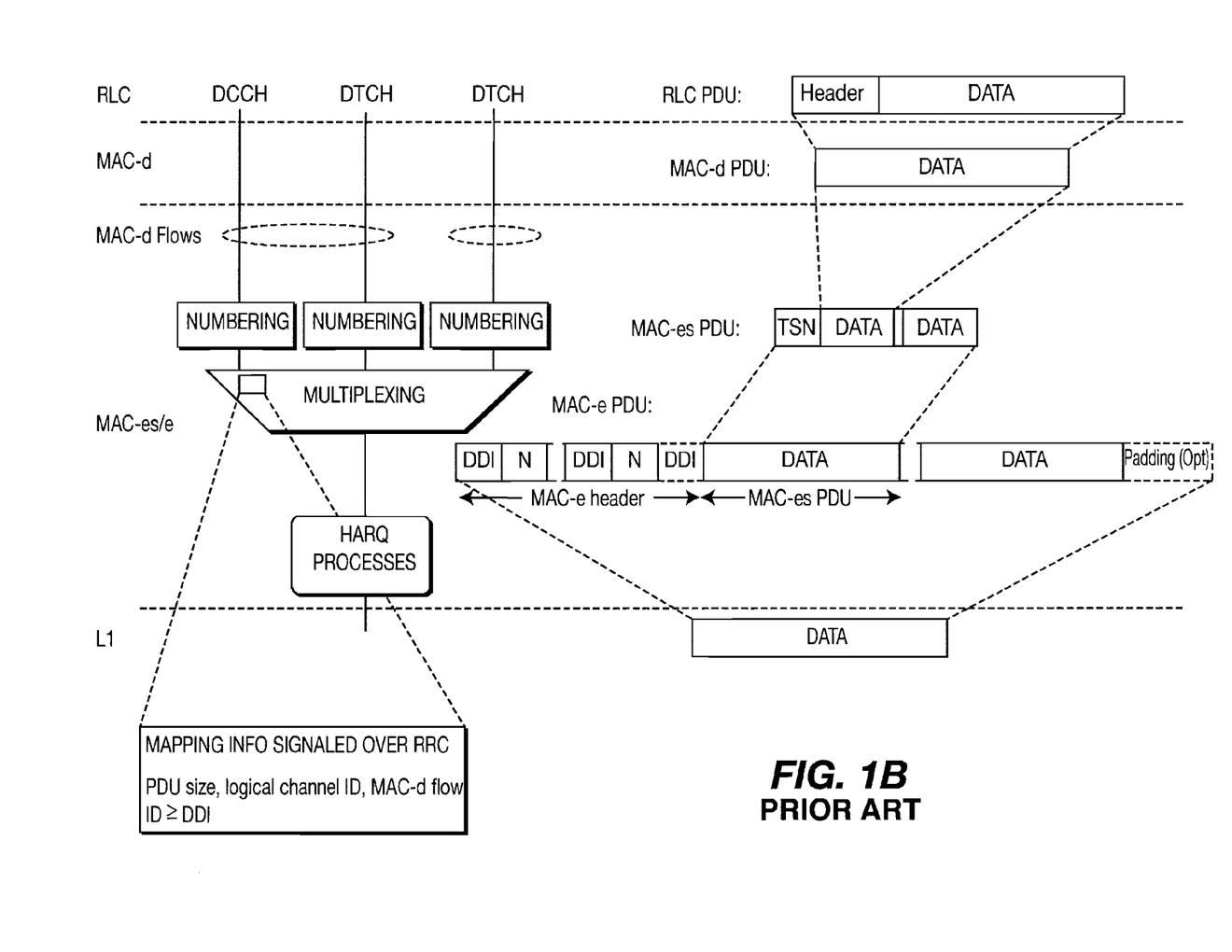
FIG. 1B prior art MAC inter-working in the conventional WTRU of FIG. 1A.

FIG. 1B shows MAC interworking in the conventional WTRU of FIG. 1A. As shown in FIG. 1B, a radio link control (RLC) protocol data unit (PDU) enters the MAC-d on a logical channel. In the MAC-e header, a data description indicator (DDI) field, (6 bits), identifies the logical channel, MAC-d flow and MAC-d PDU size. A mapping table is signaled over radio resource control (RRC) signaling to allow the WTRU to set the DDI values. The N field, (fixed size of 6 bits), indicates the number of consecutive MAC-d PDUs corresponding to the same DDI value. A special value of the DDI field indicates that no more data is contained in the remaining part of the MAC-e PDU. The transmission sequence number (TSN) field (6 bits) provides the transmission sequence number on the E-DCH 130 shown in FIG. 1A. The MAC-e PDU is forwarded to a hybrid-automatic repeat request (H-ARQ) entity, which then forwards the MAC-e PDU to layer 1 for transmission in one transmission time interval (TTI).

An efficient MAC architecture for scheduling the transmission of E-DCH data is desired.

SUMMARY

The present invention is related to a method and apparatus for scheduling transmissions via an E-DCH. A scheduled power is calculated for scheduled data flows. A remaining transmit power is calculated for the E-DCH transmission. A rate request message is generated, wherein the scheduled power, remaining transmit power and rate request message are used to select transport format combinations (TFCs) and multiplex data scheduled for the E-DCH transmission. The remaining transmit power is calculated by subtracting from a maximum allowed power the power of a dedicated physical data channel (DPDCH), a dedicated physical control channel (DPCCH), a high speed dedicated physical control channel (HS-DPCCH), an enhanced uplink dedicated physical control channel (E-DPCCH) and a power margin.

BRIEF DESCRIPTION OF THE DRAWINGS

A more detailed understanding of the invention may be had from the following description of a preferred example, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

Hereinafter, the terminology "MAC-e" will be used to reference both MAC-e and MAC-es collectively.

The features of the present invention may be incorporated into an integrated circuit (IC) or be configured in a circuit comprising a multitude of interconnecting components.

Figure 2:
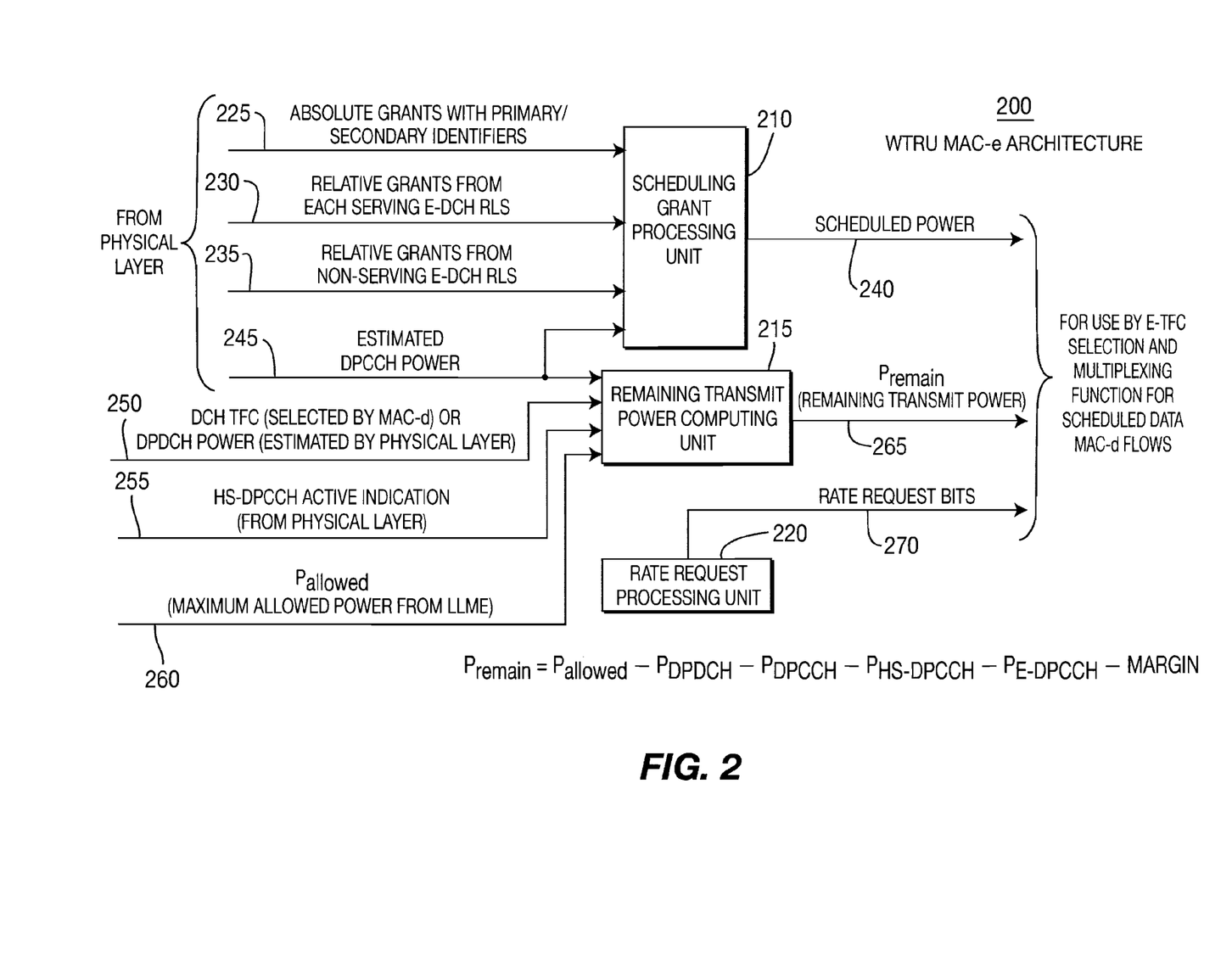
FIG. 2 shows a WTRU MAC-e architecture configured in accordance with the present invention.

FIG. 2 shows a WTRU MAC-e architecture 200 configured in accordance with the present invention. The WTRU MAC-e architecture 200 includes a scheduling grant processing unit 210, a remaining transmit power computing unit 215 and a rate request processing unit 220.

The scheduling grant processing unit 210 receives at least one scheduling grant from at least one radio link set (RLS) and derives a current scheduling grant. The scheduling grant may be an absolute grant 225 received from a serving E-DCH cell with a primary or secondary identifier, (i.e., an E-DCH radio network temporary identifier (E-RNTI) is used to determine if the absolute grant is primary or secondary), a relative grant 230 received from a serving E-DCH RLS or a relative grant 235 received from a non-serving E-DCH RLS. The scheduling grant processing unit 210 outputs a signal 240 indicating the amount of scheduled power for use by an E-TFC selection and multiplexing function for scheduled data MAC-d flows.

The amount of scheduled power may be identified as a ratio to the DPCCH power. For example, if the DPCCH power is P, the amount of scheduled power has a ratio of 2 to the DPCCH power. Thus, the amount of scheduled power is 2 P. Alternatively, the amount of scheduled power can be identified as the maximum transmit power that can be used for scheduled data to avoid the E-TFC selection and multiplexing function to be aware of DPCCH power measurements. Since DPCCH power changes rapidly, there is processing overhead if it has to be propagated to different entities within the MAC. Furthermore, it is complex to synchronize the timing. Therefore, having only one entity in the MAC-e aware of the DPCCH power is preferred since other scheduling related functions require knowledge of current DPCCH power.

When the MAC-e entity 105 invokes the MAC-e function, the scheduling grant processing unit 210 determines the current serving grant. The physical layer provides absolute grants 225 received from the AGCH, indicating whether the grant was received with a primary or secondary E- RNTI. The physical layer also provides relative grants 230, 235 received from each RLS, indicating if the RLS is either a serving E-DCH RLS or a non-serving E-DCH RLS. Absolute grants 225 are signaled as the ratio to the current UL DPCCH power. Absolute grants 225 received with a primary E-RNTI always reset the current serving grant. Absolute grants received with a secondary E-RNTI only affect the current serving grant if previously set by a secondary E-RNTI or the grant is set to zero.

Relative grants 230 from the serving E-DCH RLS adjust the serving grant in steps up, or down. Relative grants for the non-serving E-DCH RLS can only lower the serving grant by one step. When a relative grant down from a non-serving E-DCH RLS is received, a hysteresis period is started during which other relative grant downs are ignored.

The remaining transmit power computing unit 215 receives a signal 245 indicating current DPCCH power estimated by the physical layer, a signal 250 indicating an DCH TFC selected by the MAC-d or DPDCH power estimated by the physical layer, a signal 255 for indicating HS-DPCCH active from the physical layer and a signal 260 indicating maximum allowed power (with a power margin) from a lower layer management entity (LLME) configured by the radio resource controller (RRC). If the HS-DPCCH is active, its power (and power from other channels) must be subtracted from the maximum power to determine the remaining power. Based on signals 245, 250, 255 and 260, the remaining transmit power computing unit 215 outputs a signal 265 indicating a remaining transmit power ($P_{remain}$) which is computed in accordance with the following equation (1):

$$P_{remain} = P_{allowed} - P_{DPDCH} - P_{DPCCH} - P_{HS-DPCCH} - P_{E-DPCCH} - \text{Margin};$$  Equation (1)

where $P_{DPCCH}$, $P_{DPDCH}$, $P_{HS-DPCCH}$ and $P_{E-DPCCH}$ represent power requirements of the DPCCH, the DPDCH, the HS-DPCCH and the E-DPCCH, respectively. The rate request processing unit 220 monitors triggering events for rate requests, and triggers a scheduling information rate request when a triggering event occurs. The rate request processing unit 220 provides logic for triggering the rate request and logic for constructing a rate request message 270 including rate request bits.

The rate request may be triggered when new data on logical channels mapped to the E-DCH is received when there is no current scheduling grant, new data of a higher priority then last reported is received on a logical channel mapped to the E-DCH, when there is no scheduling grant and rate requests are updated and periodically generated, (which is configured by RRC procedures), and when a serving RLS acknowledgement (ACK) is not received for the previously transmitted rate request, an updated rate request is generated.

The rate request includes the total buffer occupancy for all scheduled MAC-d flows, the highest priority data buffer occupancy for any scheduled MAC-d flow, and a power headroom available for E-DCH transmission.

Figure 3:
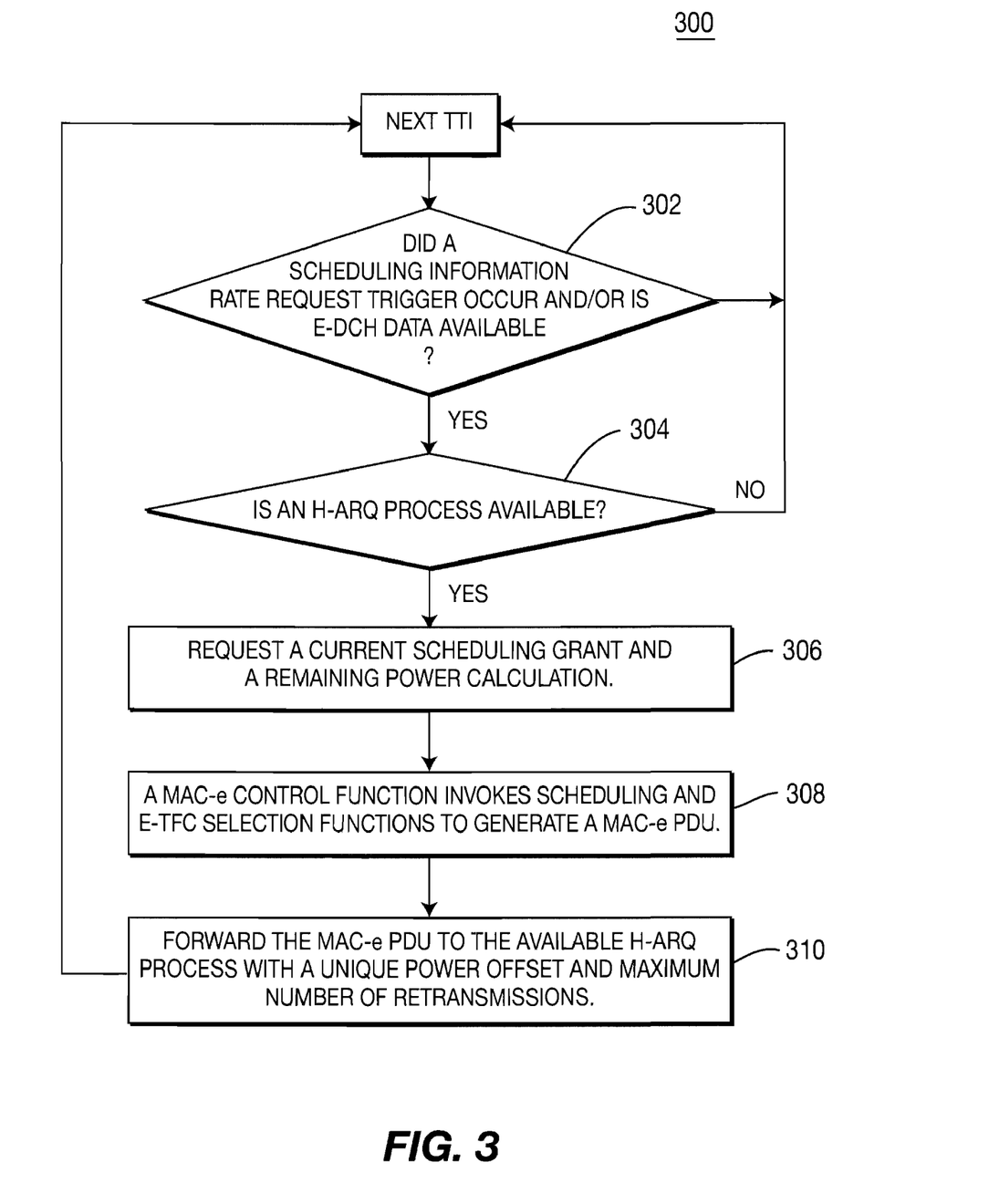
FIG. 3 is a flow diagram of a MAC-e scheduling process in accordance with the present invention.

Referring to FIG. 3, a MAC-e scheduling process 300 is explained hereinafter. For each E-DCH TTI, the E-DCH is monitored and it is determined whether a scheduling information rate request trigger occurs and/or whether there is E-DCH data with a grant available (step 302). If no rate request trigger occurs or there is no E-DCH data available, the process waits until the next TTI. If the determination at step 302 is positive, it is further determined whether there is an H-ARQ process available (step 304). Availability of an H-ARQ process is required before E-TFC selection and E-DCH data transmission. If there is no available H-ARQ process, the process 300 waits until the next TTI. If an H-ARQ process is determined to be available at step 304, a current scheduling grant and remaining transmit power calculation are requested from the scheduling grant processing unit 210 and the remaining transmit power computing unit 215, respectively (step 306). In step 308, a MAC-e control function invokes scheduling and E-TFC selection functions to generate a MAC-e PDU. In step 310, the MAC-e PDU is then forwarded to the available H-ARQprocess with a unique power offset and maximum number of retransmissions.

In a separate embodiment to meet the timing requirement of the MAC-e PDU formation, pre-calculation of the possible MAC-e PDUs for speeding up the formation process is employed. When the MAC-e entity is requested with the remaining power budget for the E-DCH transmission, the formation process searches the pre-formatted MAC-e PDU table, (mainly its formatted MAC-e PDU header and appropriated data block PDUs), providing ready information to the H-ARQ/physical layer. There are a number of ways for performing the preprocessing, depending on the timing requirement.

Figure 4:
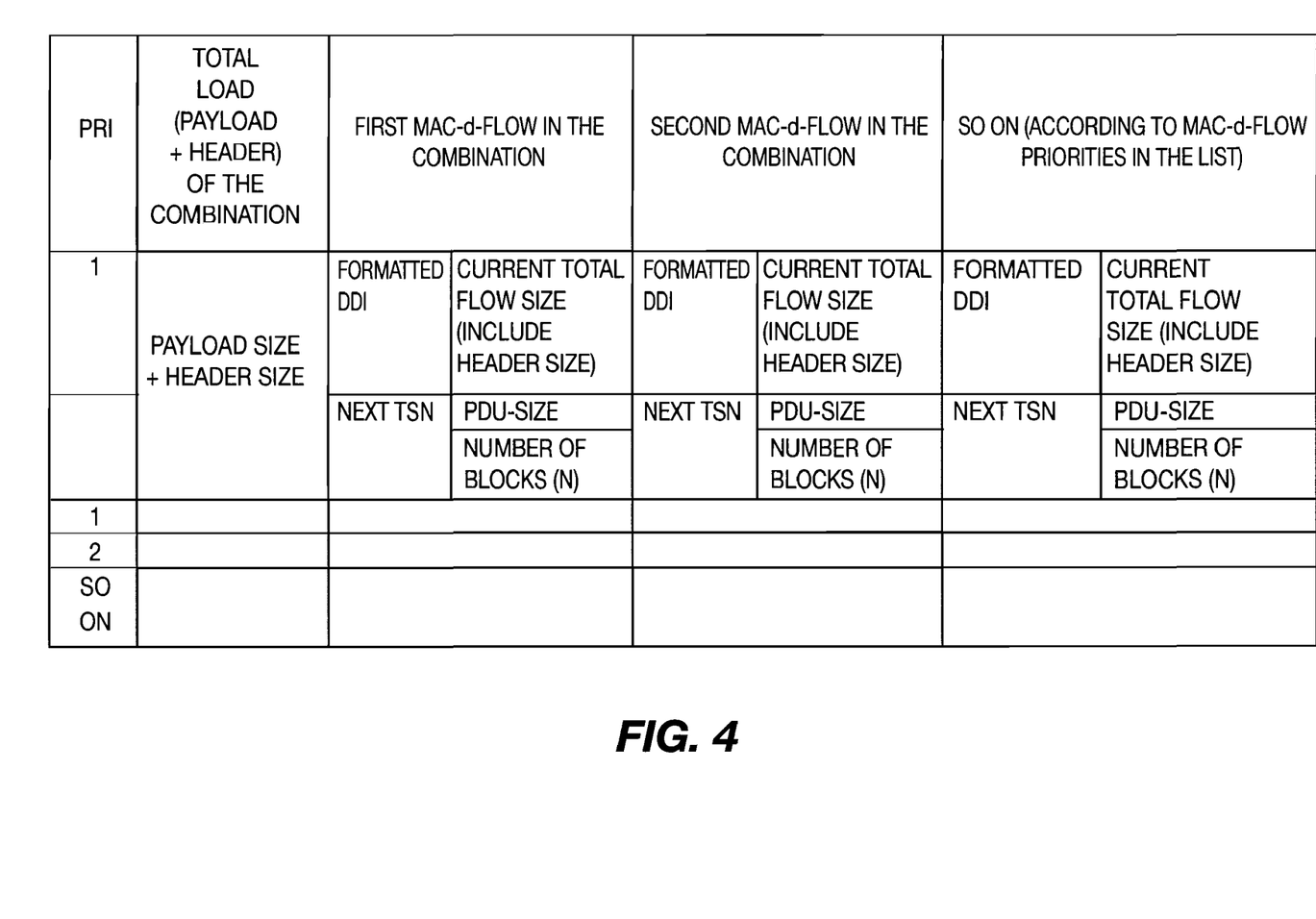
FIG. 4 shows an example of a pre-processed MAC-e PDU format in accordance with the present invention.

FIG. 4 shows an example of a preprocessed MAC-e PDU format in accordance with the present invention. The preprocessed MAC-e PDU format consists of a power budget for E-DCH or equivalent, a fully formatted MAC-e PDU header optimally fitting the budget or equivalent, a list of transmission sequence numbers (TSNs) and data block pointers, scheduling information and padding bits.

The power budget for E-DCH includes a number of predicted power or equivalent situations based on the last transmission power and the prediction of the current possible power budget. The MAC-e PDU header is formatted based on this budget and the data priority on the same row. The fully formatted MAC-e PDU header describes the MAC-e PDU, with the logical channel priority considered, and the scheduled and non-scheduled data and budget considered. The header includes the DDI, N and the DDI-terminator. A list of the MAC-es PDUs descriptors, including the TSN and data pointers to the MAC-es data blocks, correspond to the same row pre-formatted PDU header. Scheduling information may go with the MAC-e PDU if it exists. Padding bits indicate the number of bits to be padded at the end of the MAC-e PDU for that particular row. The full formation can use the following partial formation: power budget for E-DCH or Equivalent, DDI, scheduled or non-scheduled. This sorted list is based on the data priority. Each row is a MAC-d-flow, (MAC-es PDUs). The power budget is a list of predicted power budget. The DDI represents the MAC-d-flow-ID, logical channel ID and the PDU size. The scheduled or non-scheduled column indicates that the PDUs consume the non-scheduled power budget or scheduled power budget. Non-scheduled data can also be used with scheduled information in the Mac-e PDU.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of scheduling uplink data transmissions via an enhanced dedicated channel (E-DCH), the method comprising:
   calculating a scheduled power for scheduled data flows by a scheduling grant processing unit; and
   calculating a remaining transmit power for the E-DCH transmission by a remaining transmit power computing unit, wherein the remaining transmit power is calculated by subtracting from a maximum allowed power the power of a dedicated physical data channel (DPDCH), a dedicated physical control channel (DPCCH), a high speed dedicated physical control channel (HS-DPCCH), an enhanced uplink dedicated physical control channel (E-DPCCH) and a power margin.

2. The method of claim 1 further comprising:
   providing an integrated circuit incorporating the scheduling grant processing unit, the remaining transmit power computing unit and a rate request processing unit; and
   generating a rate request message by the rate request processing unit, wherein the scheduled power, remaining transmit power and rate request message are used to select transport format combinations (TFCs) and multiplex data scheduled for the E-DCH transmission.

3. The method of claim 2 further comprising:
   providing logic for triggering the rate request message; and
   providing logic for constructing the rate request message, wherein the rate request message includes a plurality of rate request bits.

4. The method of claim 2 wherein the rate request message indicates total buffer occupancy for any scheduled dedicated channel medium access channel (MAC) data flows and a power headroom available for E-DCH data transmission.

5. The method of claim 2 wherein the rate request message is triggered when there is no current scheduling grant, and new data is received on logical channels mapped to the E-DCH.

6. The method of claim 2 wherein the rate request message is triggered when new data of a higher priority than last reported is received on a logical channel mapped to the E-DCH.

7. The method of claim 2 wherein the rate request message is triggered when there is no scheduling grant and rate requests are updated and periodically generated.

8. The method of claim 2 wherein an updated rate request message is generated when a serving radio link set (RLS) acknowledgement (ACK) is not received for the previously transmitted rate request message.

9. The method of claim 1 wherein at least one scheduling grant received from at least one radio link set (RLS) is used to calculate the scheduled power.

10. The method of claim 9 wherein the at least one scheduling grant is an absolute grant received from an E-DCH cell with a primary or secondary identifier.

11. The method of claim 9 wherein the at least one scheduling grant is a relative grant received from a serving E-DCH radio link set.

12. The method of claim 9 wherein the at least one scheduling grant is a relative grant received from a non-serving E-DCH radio link set.

13. A wireless transmit/receive unit (WTRU) configured to establish an enhanced dedicated channel (E-DCH) for uplink transmissions and scheduling data transmissions via the E-DCH, the WTRU comprising:
   a scheduling grant processing unit configured to calculate a scheduled power for scheduled data flows; and
   a remaining power computing unit configured to calculate a remaining transmit power for E-DCH transmission, wherein the remaining transmit power is calculated by subtracting from a maximum allowed power the power of a dedicated physical data channel (DPDCH), a dedicated physical control channel (DPCCH), a high speed dedicated physical control channel (HS-DPCCH), an enhanced uplink dedicated physical control channel (E-DPCCH) and a power margin.

14. The WTRU of claim 13 further comprising:
   a rate request processing unit configured to generate a rate request message, wherein the scheduled power, remaining transmit power and rate request message are used to select transport format combinations (TFCs) and multiplex data scheduled for the E-DCH transmission wherein the scheduling grant processing unit, the remaining power computing unit and the rate request processing unit are incorporated into an integrated circuit.

15. The WTRU of claim 14 wherein the rate request processing unit comprises logic for triggering the rate request message and logic for constructing the rate request message, wherein the rate request message includes a plurality of rate request bits.

16. The WTRU of claim 14 wherein the rate request message indicates total buffer occupancy for any scheduled dedicated channel medium access channel (MAC) data flows and a power headroom available for E-DCH data transmission.

17. The WTRU of claim 14 wherein the rate request message is triggered when there is no current scheduling grant, and new data is received on logical channels mapped to the E-DCH.

18. The WTRU of claim 13 wherein at least one scheduling grant received from at least one radio link set (RLS) is used to calculate the scheduled power.

19. The WTRU of claim 18 wherein the at least one scheduling grant is an absolute grant received from an E-DCH cell with a primary or secondary identifier.

20. The WTRU of claim 18 wherein the at least one scheduling grant is a relative grant received from a serving E-DCH radio link set.

21. The WTRU of claim 18 wherein the at least one scheduling grant is a relative grant received from a non-serving E-DCH radio link set.

* * * * *

UNITED STATES PATENT AND TRADEMARK OFFICE
CERTIFICATE OF CORRECTION

PATENT NO.        : 8,081,595 B2
APPLICATION NO.   : 12/173363
DATED             : December 20, 2011
INVENTOR(S)       : Zhang et al.

Page 1 of 1

It is certified that error appears in the above-identified patent and that said Letters Patent is hereby corrected as shown below:

ON THE TITLE PAGE

At Section (56), OTHER PUBLICATIONS, page 1, right column, after "V6.0.0 (Mar. 2004).", insert --THIRD GENERATION PARTNERSHIP PROJECT, "Technical Specification Group Radio Access Network; Feasibility Study for Enhanced Uplink for UTRA FDD; (Release 6)," 3GPP TR 25.896 V1.0.0 (September 2003).--

Signed and Sealed this
Fourteenth Day of August, 2012

David J. Kappos
*Director of the United States Patent and Trademark Office*